(12) United States Patent
Guo et al.

(10) Patent No.: US 12,555,107 B2
(45) Date of Patent: Feb. 17, 2026

(54) METHOD AND SYSTEM FOR PRIVATE DECENTRALIZED FORWARD-SECURE CONFIDENTIAL TRANSACTIONS

(71) Applicant: JPMorgan Chase Bank, N.A., New York, NY (US)

(72) Inventors: Yue Guo, Jersey City, NJ (US); Antigoni Ourania Polychroniadou, New York, NY (US); Harish Karthikeyan, Manhattan, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 184 days.

(21) Appl. No.: 18/240,140

(22) Filed: Aug. 30, 2023

(65) Prior Publication Data

US 2024/0177150 A1 May 30, 2024

(30) Foreign Application Priority Data

Nov. 29, 2022 (GR) .............................. 20220100977

(51) Int. Cl.
 *G06Q 20/38* (2012.01)
 *G06Q 20/10* (2012.01)

(52) U.S. Cl.
 CPC .......... *G06Q 20/383* (2013.01); *G06Q 20/10* (2013.01); *G06Q 20/38215* (2013.01); *G06Q 20/3829* (2013.01); *G06Q 20/389* (2013.01)

(58) Field of Classification Search
 CPC .............. G06Q 20/383; G06Q 20/10; G06Q 20/38215; G06Q 20/3829; G06Q 20/389
 USPC .......................................................... 705/71
 See application file for complete search history.

(56) References Cited

U.S. PATENT DOCUMENTS

| | | | |
|---|---|---|---|
| 2020/0007318 A1* | 1/2020 | Camenisch | H04L 9/3218 |
| 2021/0014073 A1* | 1/2021 | Currie | H04L 9/3236 |
| 2022/0129884 A1* | 4/2022 | Agrawal | H04L 9/3218 |
| 2023/0208640 A1* | 6/2023 | El Khiyaoui | H04L 9/3247 |
| | | | 713/168 |
| 2024/0013170 A1* | 1/2024 | Gouget | G06Q 20/3829 |

* cited by examiner

*Primary Examiner* — Courtney P Jones
(74) *Attorney, Agent, or Firm* — GREENBLUM & BERNSTEIN, P.L.C.

(57) ABSTRACT

A method for facilitating payments that are executable on a decentralized network platform, such as a blockchain network platform, while providing receiver anonymity and confidentiality of transaction messages is provided. The method includes: receiving, from a payor, first information that relates to an amount of a payment being made to a recipient; receiving, from the payor, second information that relates to a secret key that corresponds to a public key associated with the payor; receiving, from the payor, third information that indicates that the sender has generated a ciphertext message that relates to the payment; and receiving, from the payor, fourth information that proves that the amount of the payment does not exceed an account balance of an account from which the payment is withdrawn. The method further includes a forward secrecy mechanism for updating the key pair of the receiver when the secret key is compromised.

20 Claims, 4 Drawing Sheets

METHOD AND SYSTEM FOR PRIVATE DECENTRALIZED FORWARD-SECURE CONFIDENTIAL TRANSACTIONS

CROSS-REFERENCE TO RELATED APPLICATIONS

This application claims priority benefit from Greek Application No. 20220100977, filed Nov. 29, 2022, which is hereby incorporated by reference in its entirety.

BACKGROUND

1. Field of the Disclosure

This technology generally relates to a method and a system for facilitating payments that are executable on a decentralized network platform while providing receiver anonymity and confidentiality of transaction messages.

2. Background Information

Blockchain systems are stateful primitives allowing parties, which are mutually distrusted, to achieve consensus about their state. For cryptocurrencies, this state may consist of information pertaining to each user's balance and the transactions affecting these balances. To achieve consensus, they simply store this state "in the clear" so that any user can simply read the original balance and the transactions to verify the consistency of the consensus. In fact, while there is no way that a wallet can be tied to a particular user, extensive research has documented that some, or most, of cryptocurrencies inherently offer a cursory notion of privacy. This sparked a long line of research aiming to offer privacy-preserving alternatives to these cryptocurrencies.

In the present disclosure, a focus is provided on the Unspent Transaction Output (hereinafter referred to as "UTXO") Model and the account-based model. Recently, a proposal for a framework was provided to achieve flexible anonymous transactions, instantiating the construction from existing work in both the UTXO Model and the account-based model constructions. However, before reviewing these models, it is useful to understand the features that are desirable. Private transactions allow the identity of the sender and/or the receiver to be hidden from anyone observing the transaction. The terms privacy and anonymity may be used interchangeably to refer to the property of hiding the identity of a sender and/or receiver. Confidential transactions allow for the payload of the transaction to remain hidden. In this work, we focus on achieving private and confidential transactions which rely on a blockchain, i.e., are decentralized.

There has been extensive research on achieving anonymity of parties and messages in the UTXO model which does not rely on accounts or balances, but rather relies on coins transferred between users akin to physical coins. ZCash and Monero are examples of privacy-preserving cryptocurrencies created in this model. However, heuristic analysis of transactions has shown that anonymity can be reduced in ZCash. Quisquis has been proposed as an alternative; this cryptocurrency achieves constant scaling of the state over time and linear scaling with the user size. Determining a user's state remains a challenge in these alternatives, requiring scanning through the entire cryptocurrency's state, making it computationally intensive and infeasible to audit individuals, for instance to pay taxes. Another approach is to actively mix coins or exchange coins to sever links. Earlier proposed solutions include centralized services posing trust issues and the need for transactions with similar amounts to be sent for meaningful link severing. Cryptographic prevention of theft has been proposed for centralized mixers, while privacy overlays allow users to swap coins themselves in a decentralized manner. Decentralized cryptographic coin mixing protocols have also been proposed for Bitcoin.

The account-based model, such as the one underpinning Ethereum, uses unique accounts to bind individuals and update balances. This model, when considered on encrypted balances, has been an attractive alternative to UTXO due to its fixed state size, which only depends on the number of users and does not increase over time. To achieve anonymity and privacy, two directions have been taken. The first direction involves mixers, which implement various randomized mappings between input and output tokens. The second direction is the line of work known as Zether, which provides anonymity of the parties and confidentiality of the payload. A key feature of this line of work is the ability of a user to determine their balance with constant additional effort.

Forward secrecy, defined herein as the exposure of a secret key at a particular point in time, should not render older encrypted conversations insecure. To ensure that a compromise of a key at a future time does not compromise the security of messages sent earlier on, it is suggested to divide time into smaller epochs with each such epoch possessing a unique key pair. Therefore, the exposure of secret key $sk_i$ should not compromise the privacy of messages encrypted with prior public keys $pk_j$, for $j<i$. Implicit in this definition is the requirement that the public key chain and the secret key chain be generated independently, without any additional communication. In both UTXO and account-based models, achieving forward secrecy is crucial for privacy preservation. However, compromising a secret key later can render earlier transactions non-private. A naive solution involves creating a new account periodically and transferring assets, from the old to the new account and requesting that all upcoming transactions be directed to this new account. However, this clearly involves a lot of friction—a sender should need to ensure that they are aware of the latest account for the intended recipient. It also requires constant participation of the receiver to keep creating new accounts. This paper aims to investigate the potential for achieving forward secrecy, taking into account security definitions, constructions, and cost implications while minimizing friction. Unfortunately, traditional constructions of forward security—public key encryption (FS-PKE) built from hierarchical identity-based encryption (HIBE) are inefficient and moreover lack inter-operability with existing homomorphic encryption schemes.

Accordingly, there is a need for a mechanism for facilitating payments that are executable on a decentralized network platform while providing receiver anonymity and confidentiality of transaction messages.

SUMMARY

The present disclosure, through one or more of its various aspects, embodiments, and/or specific features or sub-components, provides, inter alia, various systems, servers, devices, methods, media, programs, and platforms for facilitating payments that are executable on a decentralized network platform while providing receiver anonymity and confidentiality of transaction messages.

According to an aspect of the present disclosure, a method for preserving an anonymity of a recipient of a payment is provided. The method is implemented by at least one processor. The method includes: receiving, by the at least one processor from a payor, first information that relates to an amount of a first payment being made to a first recipient; receiving, by the at least one processor from the payor, second information that relates to a first secret key that corresponds to a first public key associated with the payor; receiving, by the at least one processor from the payor, third information that indicates that a sender has generated a first ciphertext message that relates to the first payment; and receiving, by the at least one processor from the payor, fourth information that proves that the amount of the first payment does not exceed an account balance of an account from which the first payment is withdrawn.

The first ciphertext message may relate to each of the first payment and at least a second payment being made to a second recipient.

Each of the first payment and the at least second payment may be being made via a blockchain platform.

The method may further include: receiving, from the payor, a second ciphertext message that includes fifth information that relates to an update offset value that is selected by the payor, encrypted by using the first public key, and used for updating the first public key in order to generate a second public key; recovering the update offset value by using the first secret key to decrypt the second ciphertext message; and using the recovered update offset value to update the first secret key in order to generate a second secret key. The fifth information may include proof that the update offset value has been correctly selected, encrypted and used for updating the first public key.

The first ciphertext message may be encrypted by using an ElGamal encryption scheme by which the fourth information is made accessible by using the first public key.

The second information may include information showing a validity of the payor by proving that the payor has knowledge of the first secret key that corresponds to the first public key associated with the payor.

The method may further include receiving, from the payor, sixth information that indicates a knowledge of a randomness being used in the first ciphertext message.

The method may further include receiving, from the payor, seventh information that indicates that a first sum of the first payment and each of the at least second payment is equal to a change in the account balance from which each of the first payment and each of the at least second payment is withdrawn.

The method may further include receiving, from the payor, eighth information that proves that the first ciphertext message is well-formed by performing a homomorphic addition operation using the account balance and the public key.

The first payment may be associated with at least one from among an account creation operation, an account funding operation, an account burning operation, and a transfer of assets operation.

According to another aspect of the present disclosure, a computing apparatus for preserving an anonymity of a recipient of a payment is provided. The computing apparatus includes a processor; a memory; and a communication interface coupled to each of the processor and the memory. The processor is configured to: receive, from a payor via the communication interface, first information that relates to an amount of a first payment being made to a first recipient; receive, from the payor via the communication interface, second information that relates to a first secret key that corresponds to a public key associated with the payor; receive, from the payor via the communication interface, third information that indicates that a sender has generated a first ciphertext message that relates to the first payment; and receive, from the payor via the communication interface, fourth information that proves that the amount of the first payment does not exceed an account balance of an account from which the first payment is withdrawn.

The first ciphertext message may relate to each of the first payment and at least a second payment being made to a second recipient.

Each of the first payment and the at least second payment may be being made via a blockchain platform.

The processor may be further configured to: receive, from the payor via the communication interface, a second ciphertext message that includes fifth information that relates to an update offset value that is selected by the payor, encrypted by using the first public key, and used for updating the first public key in order to generate a second public key; recover the update offset value by using the first secret key to decrypt the second ciphertext message; and use the update offset value to update the first secret key in order to generate a second secret key. The fifth information may include proof that the update offset value has been correctly selected, encrypted and used for updating the first public key.

The first ciphertext message may be encrypted by using an ElGamal encryption scheme by which the fourth information is made accessible by using the public key.

The second information may include information showing a validity of the payor by proving that the payor has knowledge of the first secret key that corresponds to the first public key associated with the payor.

The processor may be further configured to receive, from the payor via the communication interface, sixth information that indicates a knowledge of a randomness being used in the first ciphertext message.

The processor may be further configured to receive, from the payor via the communication interface, seventh information that indicates that a first sum of the first payment and each of the at least second payment is equal to a change in the account balance from which each of the first payment and each of the at least second payment is withdrawn.

The processor may be further configured to receive, from the payor via the communication interface, eighth information that proves that the first ciphertext message is well-formed by performing a homomorphic addition operation using the account balance and the first public key.

The first payment may be associated with at least one from among an account creation operation, an account funding operation, an account burning operation, and a transfer of assets operation.

According to yet another aspect of the present disclosure, a non-transitory computer readable storage medium storing instructions for preserving an anonymity of a recipient of a payment is provided. The storage medium includes executable code which, when executed by a processor, causes the processor to: receive, from a payor, first information that relates to an amount of a first payment being made to a first recipient; receive, from the payor, second information that relates to a first secret key that corresponds to a first public key associated with the payor; receive, from the payor, third information that indicates that a sender has generated a first ciphertext message that relates to the first payment; and receive, from the payor, fourth information that proves that the amount of the first payment does not exceed an account balance of an account from which the first payment is withdrawn.

The first ciphertext message may relate to each of the first payment and at least a second payment being made to a second recipient.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
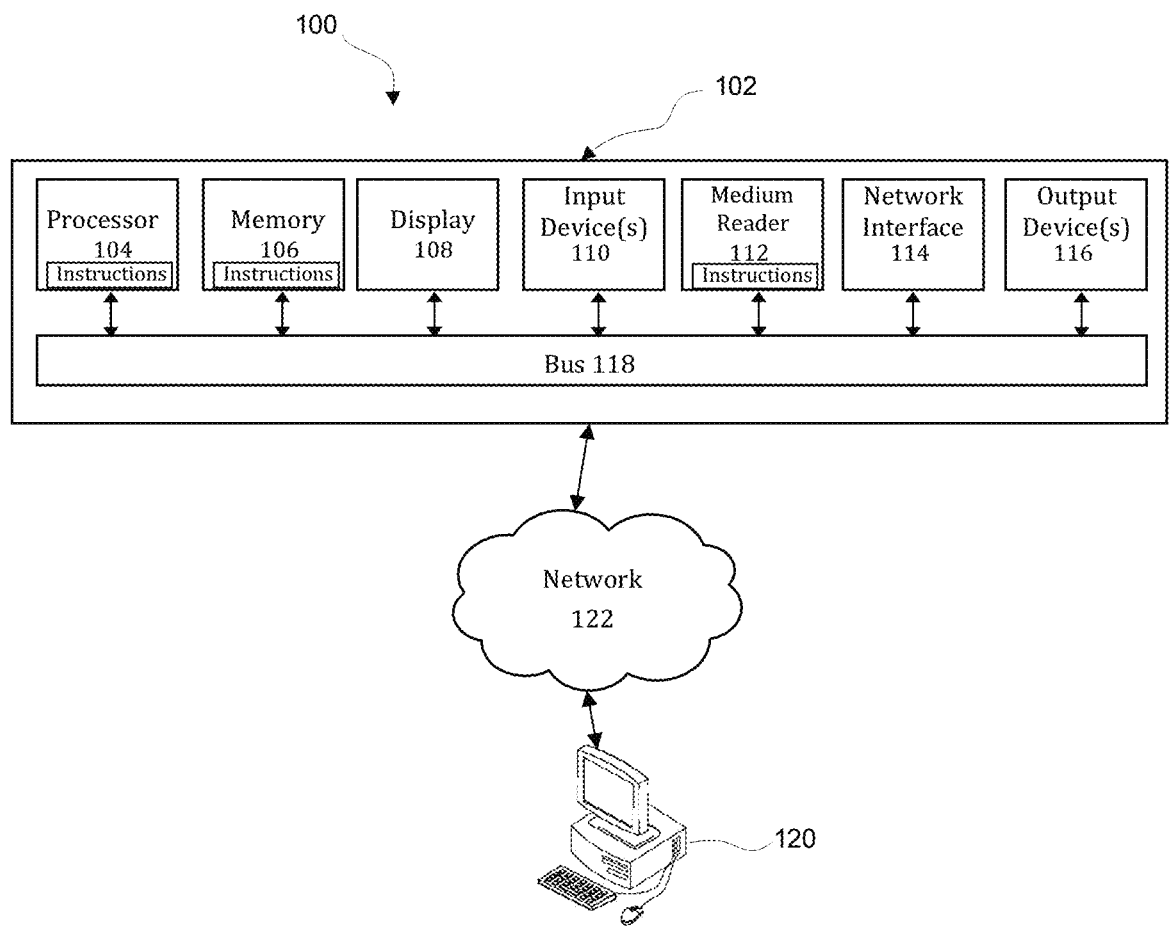
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating payments that are executable on a decentralized network platform while providing receiver anonymity and confidentiality of transaction messages.

Figure 2:
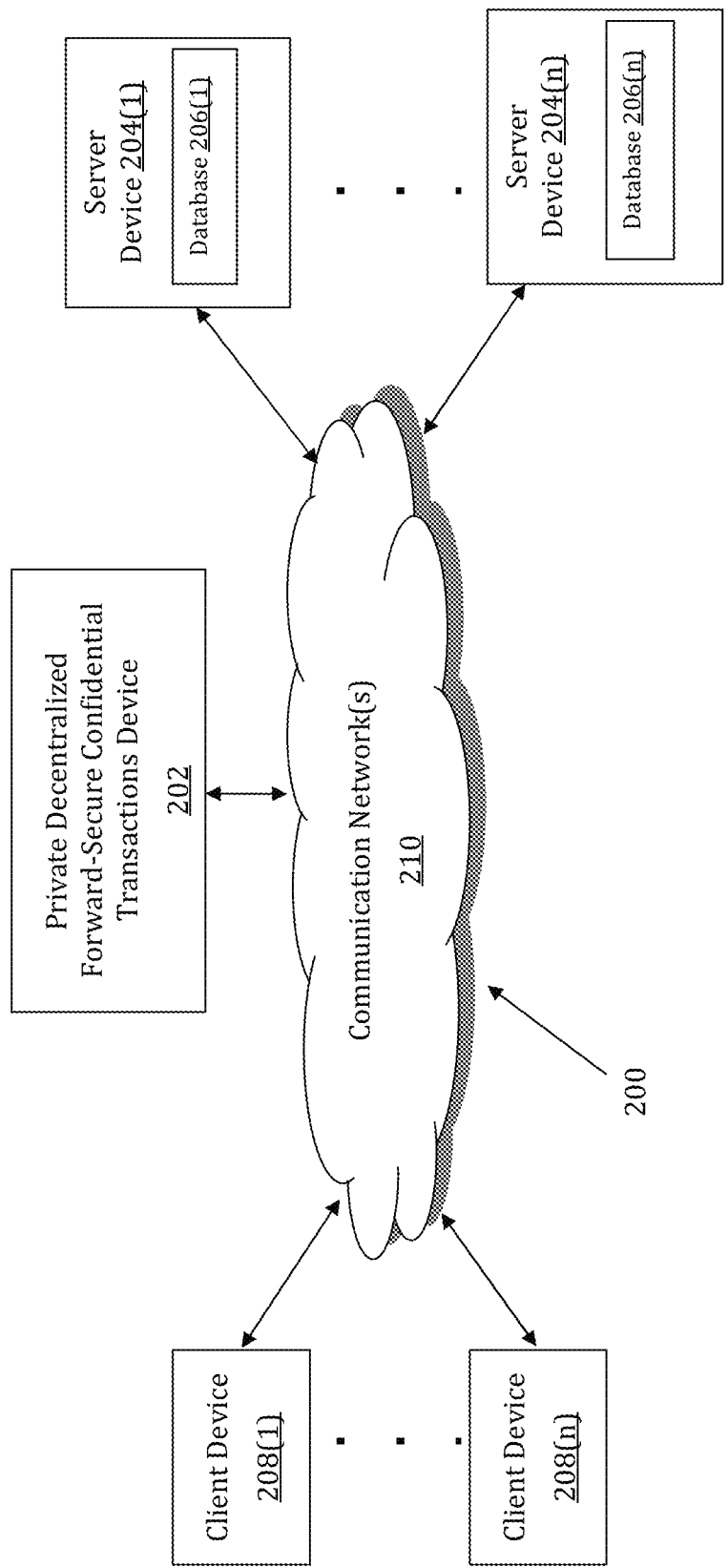
FIG. 2 illustrates an exemplary diagram of a network environment.

Referring to FIG. 2, a schematic of an exemplary network environment 200 for implementing a method for facilitating payments that are executable on a decentralized network platform while providing receiver anonymity and confidentiality of transaction messages is illustrated. In an exemplary embodiment, the method is executable on any networked computer platform, such as, for example, a personal computer (PC).

The method for facilitating payments that are executable on a decentralized network platform while providing receiver anonymity and confidentiality of transaction messages may be implemented by a Private Decentralized Forward-Secure Confidential Transactions (PDFSCT) device 202. The PDF SCT device 202 may be the same or similar to the computer system 102 as described with respect to FIG. 1. The PDFSCT device 202 may store one or more applications that can include executable instructions that, when executed by the PDFSCT device 202, cause the PDFSCT device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PDFSCT device 202 itself, may be located in virtual server(s) running in a cloud-based computing environment rather than being tied to one or more specific physical network computing devices. Also, the application(s) may be running in one or more virtual machines (VMs) executing on the PDFSCT device 202. Additionally, in one or more embodiments of this technology, virtual machine(s) running on the PDFSCT device 202 may be managed or supervised by a hypervisor.

In the network environment 200 of FIG. 2, the PDFSCT device 202 is coupled to a plurality of server devices 204(1)-204(n) that hosts a plurality of databases 206(1)-206(n), and also to a plurality of client devices 208(1)-208(n) via communication network(s) 210. A communication interface of the PDFSCT device 202, such as the network interface 114 of the computer system 102 of FIG. 1, operatively couples and communicates between the PDFSCT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PDFSCT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PDFSCT devices that efficiently implement a method for facilitating payments that are executable on a decentralized network platform while providing receiver anonymity and confidentiality of transaction messages.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PDFSCT device 202 may be a standalone device or integrated with one or more other devices or apparatuses, such as one or more of the server devices 204(1)-204(n), for example. In one particular example, the PDFSCT device 202 may include or be hosted by one of the server devices 204(1)-204(n), and other arrangements are also possible. Moreover, one or more of the devices of the PDFSCT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PDFSCT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store public exchange data and any other data that relates to providing a method and a system for facilitating payments that are executable on a decentralized network platform while providing receiver anonymity and confidentiality of transaction messages.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the PDFSCT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PDFSCT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the PDFSCT device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PDFSCT device 202, the server devices 204(1)-204(n), or the client devices 208(1)-208(n), for example, may be configured to operate as virtual instances on the same physical machine. In other words, one or more of the PDFSCT device 202, the server devices 204(1)-204(n), or the client devices 208(1)-208(n) may operate on the same physical device rather than as separate devices communicating through communication network(s) 210. Additionally, there may be more or fewer PDFSCT devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
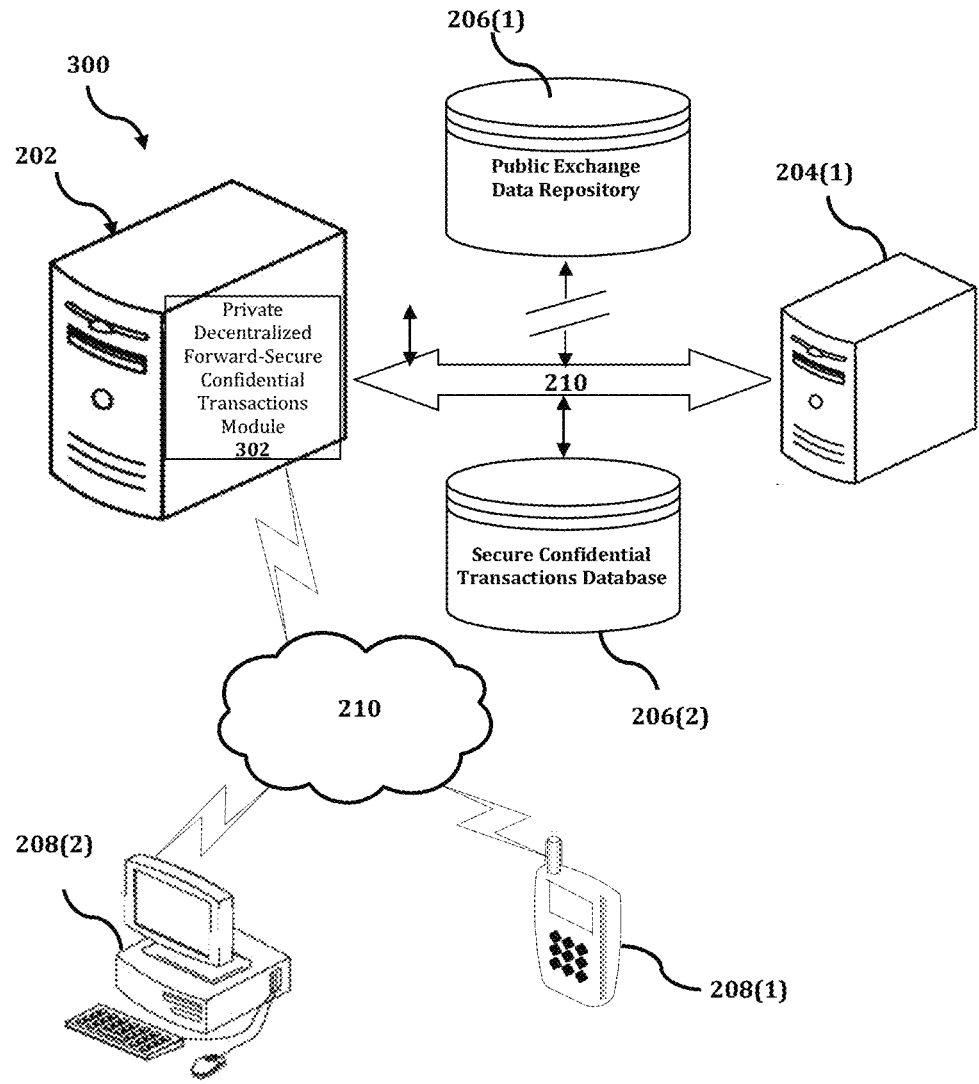
FIG. 3 shows an exemplary system for implementing a method for facilitating payments that are executable on a decentralized network platform while providing receiver anonymity and confidentiality of transaction messages.

The PDFSCT device 202 is described and illustrated in FIG. 3 as including a private decentralized forward-secure confidential transactions module 302, although it may include other rules, policies, modules, databases, or applications, for example. As will be described below, the private decentralized forward-secure confidential transactions module 302 is configured to implement a method for facilitating payments that are executable on a decentralized network platform while providing receiver anonymity and confidentiality of transaction messages.

An exemplary process 300 for implementing a system for facilitating payments that are executable on a decentralized network platform while providing receiver anonymity and confidentiality of transaction messages by utilizing the network environment of FIG. 2 is illustrated as being executed in FIG. 3. Specifically, a first client device 208(1) and a second client device 208(2) are illustrated as being in communication with PDFSCT device 202. In this regard, the first client device 208(1) and the second client device 208(2) may be "clients" of the PDFSCT device 202 and are described herein as such. Nevertheless, it is to be known and understood that the first client device 208(1) and/or the second client device 208(2) need not necessarily be "clients" of the PDFSCT device 202, or any entity described in association therewith herein. Any additional or alternative relationship may exist between either or both of the first client device 208(1) and the second client device 208(2) and the PDFSCT device 202, or no relationship may exist.

Further, PDFSCT device 202 is illustrated as being able to access a public exchange data repository 206(1) and a secure confidential transactions database 206(2). The private decentralized forward-secure confidential transactions module 302 may be configured to access these databases for implementing a method for facilitating payments that are executable on a decentralized network platform while providing receiver anonymity and confidentiality of transaction messages.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PDFSCT device 202 via broadband or cellular communication. Of course, these embodiments are merely exemplary and are not limiting or exhaustive.

Upon being started, the private decentralized forward-secure confidential transactions module 302 executes a process for facilitating payments that are executable on a decentralized network platform while providing receiver anonymity and confidentiality of transaction messages. An exemplary process for facilitating payments that are executable on a decentralized network platform while providing receiver anonymity and confidentiality of transaction messages is generally indicated at flowchart 400 in FIG. 4.

Figure 4:
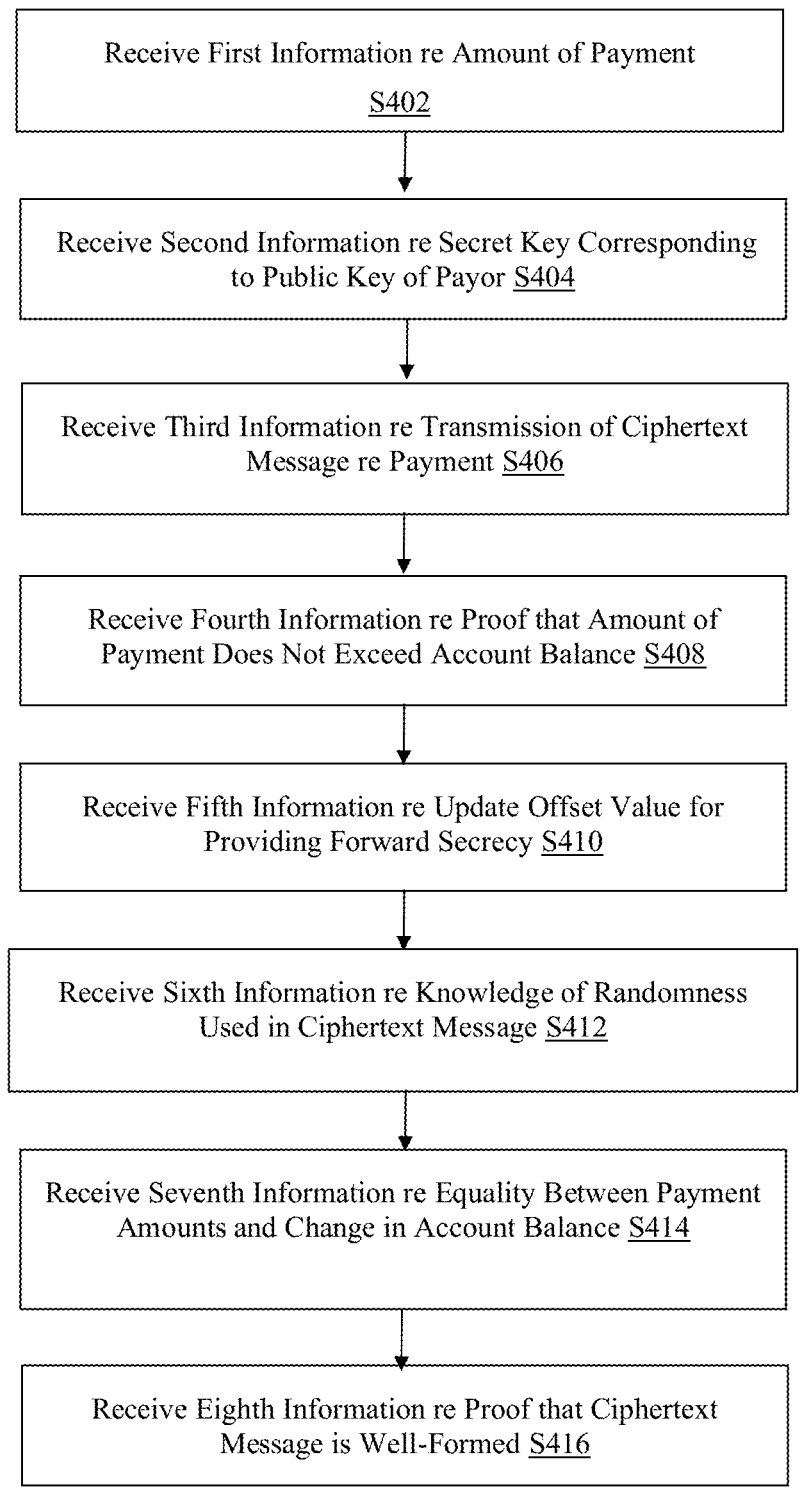
FIG. 4 is a flowchart of an exemplary process for implementing a method for facilitating payments that are executable on a decentralized network platform while providing receiver anonymity and confidentiality of transaction messages.

In process 400 of FIG. 4, at step S402, the private decentralized forward-secure confidential transactions module 302 receives first information that relates to an amount of a first payment that is being made to a first recipient by a payor. In an exemplary embodiment, the first payment may be associated with any one or more of an account creation operation, an account funding operation, an account burning operation, a transfer of funds operation, and/or any other suitable type of operation for which a payment transaction may be executed. In an exemplary embodiment, the first payment is being made via a decentralized platform, such as, for example, a blockchain platform.

At step S404, the private decentralized forward-secure confidential transactions module 302 receives second information that relates to a secret key that corresponds to a public key associated with the payor. In an exemplary embodiment, the second information includes information that shows a validity of the payor by proving that the payor has knowledge of the secret key that corresponds to the public key associated with the payor.

At step S406, the private decentralized forward-secure confidential transactions module 302 receives third information that indicates that a sender has generated a ciphertext message that relates to the first payment. Then, at step S408, the private decentralized forward-secure confidential transactions module 302 receives fourth information that proves that the amount of the first payment does not exceed an account balance of an account from which the first payment is withdrawn. In an exemplary embodiment, the ciphertext message is encrypted by using an ElGamal encryption scheme by which the fourth information is made accessible by using the public key associated with the payor.

At step S410, the private decentralized forward-secure confidential transactions module 302 receives a second ciphertext message that includes fifth information that is usable for providing forward secrecy in connection with the payment. In this aspect, when a secret key is compromised at a particular time, any communication prior to that time should still be securely encrypted, but any information that is decryptable by that secret key has become insecure. Forward secrecy may be effected by enabling the payor to help update the receiver's key-pair, and then once the receiver updates the secret key, the payor's transaction is rendered secure, because the new key cannot be used to decrypt the old transaction. In an exemplary embodiment, forward secrecy may be implemented by having the payor select an update offset value, encrypt the selected update offset value by using the public key, and use the encrypted value for updating the public key in order to generate a second public key. The second public key is then sent to the receiver, who then recovers the update offset value by using the secret key to decrypt the encryption of the update offset value, and then uses the update offset value to update the secret key in order to generate a second secret key. The fifth information also includes proof that the update offset value has been correctly selected, encrypted and used for updating the original public key.

In an exemplary embodiment, the process 400 is applicable to multiple payments being made by the payor; i.e., in addition to the first payment being made to a first recipient, there may be a second payment being made to a second recipient, a third payment being made to a third recipient, etc., and all of these payments may be batched together in a manner such that each of steps S402, S404, S406, S408, and S410 is performed with respect to all of the payments included in the batch. Importantly, in step S408, the fourth information provides proof that the aggregate amount of all payments included in the batch does not exceed the account balance of the account associated with the payor.

At step S412, the private decentralized forward-secure confidential transactions module 302 receives sixth information that indicates a knowledge of a randomness being used in the original ciphertext message. Then, at step S414, the private decentralized forward-secure confidential transactions module 302 receives seventh information that indicates that the sum of the amounts of all of the batched payments is equal to a change or a delta in the account balance of the account associated with the payor.

Finally, at step S416, the private decentralized forward-secure confidential transactions module 302 receives eighth information that proves that the original ciphertext message is well-formed by performing a homomorphic addition operation using the account balance and the public key associated with the payor. This homomorphic addition operation is described in more detail below.

The present disclosure focuses on achieving forward secrecy in the account-based model without requiring an active participation of receivers. The updatable public key encryption (UPKE) primitive allows a sender to help evolve the secret key of the receiver by encrypting an update offset δ with the receiver's public key, thus enabling the receiver to update their secret key with the recovered δ. The sender can also update the public key with the knowledge of δ, allowing the receiver to stay offline for some epochs. It has been shown that the hashed ElGamal construction is a secure UPKE, but it lacks an efficient zero-knowledge proof for the well-formedness of the update ciphertext and the updated public key, and it is not homomorphic. Therefore, a standard model construction is required. Conventional constructions of UPKE in the standard model include schemes secure under Decisional Diffie Hellman (DDH) assumption, Learning With Errors (LWE) assumption, Decisional Composite Residuosity Assumption, and Hidden Subgroup Membership (HSM) Assumption. However, the DDH and LWE constructions have impractical parameter sizes, and the DCR-based construction is not easily modified to work with ElGamal encryption, which is preferred for of homomorphic encryption. Although an HSM-based construction exists, it has not been instantiated on Solidity and the libraries used for Ethereum, leaving it as a direction for future research. The present disclosure describes an approach focuses on achieving forward secrecy in the account-based model, which can be easily implemented on Solidity.

Confidential, Private Transactions in the Account-Based Model: There exist two broad directions on which Confidential and Private Transactions are allowed in the account-based model. In the first setting, the idea is to constantly mix or tumble the coins. This idea has been translated into the setting of an Ethereum blockchain that operates in the account-based model. The idea is to use a smart contract to replace the centralized mixing service.

Smart Contract as a Mixer: On-chain mixers allow users to deposit their coins, receiving a note in return. Upon deposit, they must provide a new account address to which the coins need to be transferred, from which they will withdraw later by presenting the note received at the time of deposit. Other users can also deposit funds, which are mixed together to break the link between old and new addresses. Waiting longer increases anonymity. One can use zero-knowledge proofs, including zero-knowledge Succinct Non-interactive Arguments of Knowledge (zk-SNARKs), to ensure this unlinkability.

A secure construction called Mobitis has been proposed for facilitating fund transfers between hypothetical persons Alice and Bob with provable security guarantees. Mobitis achieves low off-chain communication compared to existing centralized and decentralized mixers. To ensure privacy, Alice and Bob need to share Bob's master public key, a shared secret, and a nonce to derive new "decoy public keys" that sever linkability between addresses. A smart contract is used to gather sufficient user deposits before Bob can withdraw. Alice can notify Bob off-chain about the contract address, or Bob can find it independently if one were to assume all contracts are registered. Bob then withdraws by creating a linkable ring signature using the available decoy public keys, by proving that it has a secret corresponding to one of these public keys, and also ensuring that this proof can only be used once. Unfortunately, Mobitis has fixed denominations for transactions, requires waiting for participants, mandates withdrawal after each mixing, and requires active user participation though it supports auditability.

ZETH is a smart contract-based implementation of the Zerocash protocol on the Ethereum blockchain. It allows users to exchange funds for zethNotes which can be reused repeatedly within the contract. Rather than actually transferring these notes from one user to another, the contract works by having the sender consume a set of input notes and produce a set of output notes. Those input notes cannot be used again. ZETH uses zero-knowledge proofs to ensure the correctness of all required operations and to prove that every input note was destroyed while producing output notes. However, ZETH suffers from information leakage, which compromises sender privacy. It also inherits some drawbacks of Zerocash, such as trusted setup and monotonically increasing size of coins/commitments. ZETH avoids off-chain communication by using the ability of a smart contract to notify and supports arbitrary denominations for transactions with minimal-to-no latency. Nevertheless, it requires the active participation of users, and the receiver needs to monitor events emitted by the sender's invocation of contracts, retrieve all output notes, and verify the sender was honest in providing output commitments.

AMR is a contract-based coin mixer that employs a zk-SNARK-based approach similar to ZETH. It allows deposited funds to accrue interest and enables privacy-preserving reward payment. Clients deposit coins and obtain a note, which is used to withdraw the funds later. The zk-SNARK-based Merkle Tree is used to generate proof that the note corresponds to a transaction and has not been withdrawn already. The note and proof are used to withdraw funds to a new address, severing the linkability between the source and destination addresses. AMR achieves a more efficient zk-SNARK than ZETH, but suffers from several drawbacks, such as natively not supporting the transfer of coins between two users, requiring fixed denomination of coins, and the depositor having to withdraw into a new account address, which is an overhead for the client and has auditability issues. Other approaches such as Aztec and Tornado Cash exist, using different cryptographic tools and functionality, but they all require the active participation of some or all users.

Smart Contract for Privacy: Zether and Anonymous Zether are private payment mechanisms that use an Ethereum smart contract to achieve confidential and private payments while allowing passive participation. The smart contract encrypts and stores account balances, and users can transfer funds into and out of these special accounts. ElGamal encryption and its homomorphic properties are used to ensure that the balance is kept encrypted and updated. This allows for a payment system that is independent of the system's overall state size and the client's last synchronization, and it only requires registration with the contract. The use of a stateful smart contract allows for easy identification of whether one is a party of a transaction, unlike solutions including Quisquis and some other mixer-based solutions. This also implies that one can efficiently audit the system as well. These features make Zether and Anonymous Zether suitable for deployment in resource-constrained devices. The downside of these solutions is the gas consumption that is required to verify zero knowledge proofs. However, the other properties make them worthy of consideration, especially given these ease of interoperability with other smart contracts.

Zether enables users to perform confidential transactions, where a user can send money to another user without revealing the amount sent. To achieve this, Zether generates ciphertexts that debit the sender's balance by a value b and credit the receiver's balance by the same value. Zether uses zero-knowledge proofs to prove certain facts about these ciphertexts without revealing any secret information. For instance, the sender must prove that they have enough balance to send the money, and that the money is indeed credited to the receiver's account. It also ensures that the message is posted by the actual sender and not by someone without knowledge of the sender's secret key.

Anonymous Zether ensures the privacy of the sender and receiver's identity in a transaction by having Alice generate a ring of users containing both Alice and Bob, along with decoy users, and encrypting their balances as before. Among the ciphertexts for all users in the ring, hidden indices sen and rec correspond to the identity of the sender and receiver. Alice must now prove information corresponding to these two additional secrets using many-out-of-many proofs.

Sender Anonymity: It is observed that the proposed protocol is sender anonymous because an adversary, with access to the posted ciphertexts, cannot determine the underlying payload from the security of the encryption scheme. However, there exists a trivial way to break sender anonymity. An observer can simply observe the person posting the message onto the transaction pool. Note that most standard architectures of blockchains operate by having senders post messages onto the transaction pool. This transaction pool serves as a buffer from which the block proposer reads the messages and then a consensus protocol commences, which leads to the proposed block either being written onto the chain or rejected. Therefore, a passive observer can trivially break the sender anonymity, while the receiver anonymity is still guaranteed given the security of encryption. This can be avoided by repeatedly routing the messages via a Tor-like solution.

The present disclosure is focused in the following setting: 1) It does not require extensive active participation of any users for the success of the operation; specifically, the receiver does not need to be active. 2) It works in the account-based model which has support for smart contracts. 3) It offers a payment mechanism that can achieve confidential payload and receiver(s) anonymity. 4) It supports batching of multiple transactions in one big message. 5) The smart contract can be interoperable with other smart contracts. 6) It offers support for forward secrecy, without requiring active receiver participation, a mechanism that can be implemented with little friction.

Forward Secrecy and Decentralized Payment Systems: In an exemplary embodiment, consideration is given to the dimension of forward secrecy in the context of payment systems that are designed to offer privacy, and forward secrecy is a much-needed feature in most secure messaging applications.

Private Decentralized Confidential Transactions (PriDe CT): In an exemplary embodiment, a payment system is designed to satisfy each of the following criteria: (a) it is in the account-based model, (b) it is consensus driven, (c) it ensures the privacy of the receiver, (d) it ensures the confidentiality of transaction payloads, and (e) it supports batching multiple transfers into a single posted transaction message. The sender begins by sampling an anonymity set. In a departure from Anonymous Zether, more than one party in the anonymity set can receive non-zero payloads. The security of the encryption will shield the identity, or possibly identities, of the receiver(s). Note that the number of values has been increased to prove that it falls within a range. However, reliance may be placed on Bulletproofs, which includes a protocol on how to conduct range proofs on possibly many values, but with only logarithmic overhead. This batching of transactions is indeed an attractive feature. Crucially, this protocol does not require any zero-knowledge proofs of knowledge around secret indices in an array of ciphertexts. This helps to avoid tools such as many-out-of-many proofs, while exploiting it to allow for batching of transactions. Indeed, the required proofs only rely on a primitive known as $\Sigma$-bullets that combine a traditional $\Sigma$-protocol with powerful Bulletproof techniques.

Performance of PriDe CT: The present disclosure provides an open-source implementation of PriDe CT. PriDe CT has a competitive performance, despite the overhead of additional zero-knowledge bulletproofs on more payloads. In an exemplary embodiment, the protocol is much simpler to understand, relying only on $\Sigma$-bullets. Concretely, when compared with existing protocols such as Quisquis and Anonymous Zether in both UTXO and account-based models, transaction sizes are much smaller, both in the number of group elements and field elements, while allowing for multiple batched transactions. For example, if it is assumed that N=32, PriDe CT performs better than Anonymous Zether if the sender wishes to communicate with at least seven (7) of the chosen receivers for that round. These seven transfers can be batched in one transaction message in PriDe CT, which performs better than repeating Anonymous Zether seven times for each of them. The asymptotic performance is identical to Anonymous Zether. Moreover, further leveraging of the clear partition in the indices of the sender and the receiver, be it real or decoy, is available to support a greater level of concurrent transactions than Anonymous Zether.

Private DEcentralized Forward-secure Until Last update Confidential Transactions (PriDE FUL CT): In an exemplary embodiment, an extension of PriDe CT that achieves Forward-security Until Last update is provided. This uses the UPKE technique. However, the approach of having the sender evolve the public key does not scale. If the sender has a large receiver set, the process of evolving the key for each of these is a substantial overhead. Each system can apply its own policy, and proactively update for all the receivers, or alternatively, for a customized subset of them or for any one of the receivers it chooses at random for a more targeted approach. The perplexing issue of determining which sender update to use arises when two or more senders can have the same receiver. The benefit of using UPKE is that a malicious sender, choosing to update a receiver's key, cannot compromise the secret key itself unless it retrieves the secret key. This is a good hedge for the present purpose. The only point to note is that concurrent evolution of key material by two senders for one receivers can be enforced by either having the smart contract breaking the tie using expensive randomness, or by a first come first served approach, signifying that the rest of the transactions are rejected, or reject all the transactions and wait for them to be re-submitted. In summary, the results are as follows: 1) It is shown that ElGamal Encryption is a secure UPKE under the DDH Assumption. 2) The security definition of sender-aided forward secrecy until last update is formalized. 3) It is shown that by using the ElGamal-based UPKE and appropriate $\Sigma$-protocol, FUL security of Zether is achieved under the DDH Assumption. 4) An introduction of PriDe CT, which simplifies the Anonymous Zether protocol while allowing for batched transactions and receiver anonymity, is provided. 5) A roadmap to achieve PriDeFUL CT that is FUL Secure from PriDe CT is provided by using a similar approach as FUL-Zether. 6) Finally, an open-sourced implementation of the protocol implemented with Javascript, Node.js, and Solidity is disclosed.

In an exemplary embodiment, Sender $S_i$ with secret key $(sk_0, pk_0)$ is sending $pl_1, \ldots, pl_t$ to receivers with public keys $pk_1, \ldots, pk_t$. It also means that $pl_0 = \Sigma_{i=1}^{t} pl_i$ is debited from the account of sender. There is a need to ensure that all pl i are non-negative. Further, let bal' be the balance left in the sender's account, after this transaction. It is also necessary that this residual balance must be non-negative. The transaction is posted as a set of ciphertexts defined as: $C=g^r, pk_0$, $D_0=(pk_0^r \cdot g^{-pl_0}), \{pk_i, D_i=(pk_i^r \cdot g^{pl_i})\}_{i=1}^{t}$. Further, let newC, newD$_0$ denote the encryption of the residual balance (i.e., bal') of the sender. The statement that the sender needs to prove is the following: Validity of Sender: The sender needs to establish its validity by proving knowledge of some secret, i.e., it proves the knowledge of its secret key $sk_0$ that corresponds with the public key $pk_0$ for sender $S_i$.

Validity of Encryptions: The sender needs to prove that (a) it is the party that has generated the ciphertext by proving the knowledge of the randomness which is being used in the ciphertext, and (b) that there is conservation of amount, i.e., the sum total of all payload is zero. In this aspect, it proves the knowledge of r such that 1) $C=g^r$, and 2) balance of Transactions Holds, i.e., money debited is also money credited: $\Pi_{j=0}^{t} D_j = (\Pi_{j=0}^{t} pk_j)^r$.

Validity of Payload: The sender needs to prove that it has not spent more than it has in its account and also specifically proving that it has not maliciously tried to receive money. These are the proof statements: bal', $pl_0$, $pl_1$, ..., $pl_t \in \{0, \ldots, MAX\}$.

Well-formedness of ciphertext: 1) $D_0 = C^{sk_0} \cdot g^{-pl_0}$, 2) for $nC_0, nD_0$ being the result of homomorphic addition of $S_i$'s balance, this yields $nD_0 = nC_0^{sk_0} \cdot g^{-pl_0}$, and 3) the ciphertext is correctly formed, i.e., that $D_i = (pk_i^r \cdot g^{pl_i})$ for $i=1, \ldots, t$. This is similar to the validity of encryptions step.

Finally, the conditions can be combined, for each sender $S_i$, to yield the following relation:

$$\mathcal{R}_{PriDeCT}:$$

$$\left\{ (pk_j, D_j)_{j=0}^{t} \quad (pl_j)_{j=0}^{t} \quad \middle| \quad \begin{array}{l} g^{sk_0} = pk_0 \wedge C^{sk_i} \cdot g^{-pl_0} = D_0 \wedge \\ nC_0^{sk_0} \cdot g^{bal'} = nD_0 \\ (D_j = (pk_j)^r \cdot g^{pl_j})_{j=1}^{t} \wedge C = g^r \wedge \\ \prod_{j=0}^{t} D_j = \left( \prod_{j=0}^{t} pk_j \right)^r \\ pl_0, \ldots pl_t, bal' \in \{0, \ldots, MAX\} \end{array} \right\}$$

C, $(nC_0, nD_0)$ bal', $sk_0$, $r$

TABLE 1

Glossary of Variables

| | |
|---|---|
| sk | Secret key of the sender |
| $pk_0$ | Public key of the sender |
| $pk_1, pk_2, \ldots, pk_t$ | Public keys of the receivers |
| $pl_0$ | Total money sent by the sender |
| bal' | Residual balance of the sender. This value is set as follows: $pl_{t+1}$ = bal' |
| $pl_1, pl_2, \ldots, pl_t$ | Amounts sent to receivers with public keys $pk_1$, $pk_2, \ldots, pk_t$ |
| r | Randomness used for ElGamal encryption |
| C | The $g^r$ term of the ElGamal encryption |
| $D_0$ | Encryption of $-pl_0$ under public key $pk_0$ |
| $D_1, D_2, \ldots, D_t$ | Encryption of $pl_j$ under public key $pk_j$ for j = 1, 2, ... t |
| $(nC_0, nD_0)$ | Valid ElGamal encryption of $pl_{t+1}$ Obtained by homomorphic multiplication |

In either of the UTXO model or the account-based model, models, it is imperative that consideration be given to the impact of forward secrecy, or lack thereof. At the core of the privacy-preserving efforts lies a secret key. However, considering that the blockchain is designed to be an immutable ledger that logs all transactions, it is conceivable that the compromise of a secret key much later can render earlier transactions non-private. Therefore, the approach and the cost involved to achieve forward secrecy are investigated, at least with respect to the weaker notion where the key chains are generated by the sender.

Achieving Forward-secure Zether: The sender Alice wishes to ensure that any future compromise of the secret key of Bob does not compromise the security of Alice's posted payload. Therefore, using the techniques of Updatable Public Key Encryption, it is required that Alice does the following additional steps: 1) Sample a random $\delta \in \mathbb{F}_q$. 2) Then computes an update ciphertext that would encrypt this $\delta$. Looking ahead, this $\delta$ would be updating the secret key of Bob (i.e., the receiver) from $sk_B$ to $sk_B + \delta$. $up = (g^{r'}, pk_B^{r'} \cdot g^{\delta})$. 3) Update the public key of Bob to $pk'_B = pk_B \cdot g^{\delta}$. The fact that this update is correct is provable by using a $\Sigma$-proof. 4) Also provide the offset of $E=nC_B^\delta$ where $nC_B=oC_B$, with knowledge of the secret $\delta$, relying again on $\Sigma$-proof to prove that this offset is correct. The purpose of this offset is to evolve the updated balance of Bob to the new epoch, corresponding to public key $pk'_B$.

The posted message looks as follows:

$(C=g^r, D_0=(pk_A, pk_A^r \cdot g^{-p1}), D_1=(pk_B, pk_B^r \cdot g^{pl}), up, pk'_B, E)$.

The additional zero-knowledge proof involves: 1) knowledge of r' and $\delta$ such that $up=(g^{r'}, pk_B^{r'} \cdot g^\delta)$; 2) knowledge of $\delta$ such that $E=(nC_B)^\delta$; 3) knowledge of $\delta$ such that $pk'_B = pk_B \cdot g^\delta$.

$\mathcal{R}_Z$:

$$\left\{\begin{array}{l|l} (pk_A, D_0, pk_B, D_1, C) : p1 \\ (nC_A, nD_A) \quad\quad bal' \\ (nC_B, up, pk'_B, E) \quad sk_A \\ \quad\quad r \\ \quad\quad r' \\ \quad\quad \delta \end{array} \middle| \begin{array}{l} g^{sk_0} = pk_0 \wedge C^{sk_A} \cdot g^{-p1} = D_0 \\ nC^{sk_0} \cdot g^{bal'} = nD_0 \\ C = g^r \wedge, (pk_A \cdot pk_B)^r = (D_0 \cdot D_1) \\ p1, bal' \in \{0, \ldots, MAX\} \\ up = \left(g^{r'}, pk_B^{r'} \cdot g^\delta\right) \\ pk'_B = pk_B \cdot g^\delta \wedge E = nC_B^\delta \end{array}\right\}$$

Implementation: In an exemplary embodiment, experimental results indicate an overhead of 166 ms in proving time and 82147 units in gas consumption, per sender, to achieve FUL security in Zether.

The above construction fundamentally employs the UPKE Construction based on ElGamal Encryption. This scheme can thus leverage a graph-based fast-forwarding paradigm that helps a receiver who is stuck in epoch i to evolve the key to epoch j in time log(j−i). This is faster than the naive approach of evolving key sequentially. They build this primitive from any homomorphic UPKE, and it can be shown that indeed the ElGamal construction is homomorphic UPKE. Furthermore, the ElGamal encryption scheme is a very efficient construction of UPKE with Fast-Forwarding feature. Despite the benefits, it is important to note that a recipient must take a discrete log to retrieve the $\delta$; however, if they only wish to check their balance infrequently, this step is omitted and only undertaken when necessary. To avoid the discrete log, one can potentially use the hashed ElGamal encryption, which has also been proven to be indistinguishability of ciphertexts under chosen-plaintext attack (IND-CR-CPA) secure. However, there is a critical issue where all posted transactions need to have proof of well-formedness. Unfortunately, encrypting the offset $\delta$ as (g r, H(pkr)$\oplus\delta$) does not have an efficient proof of well-formedness. The closest one can achieve is to use ZKBoo to prove the well-formedness of the ciphertext, which is computationally expensive.

In an exemplary embodiment, a construction of PriDeFUL CT is provided. The approach taken is similar to the approach of "bootstrapping" Zether with an updatable public key encryption scheme to achieve Forward-secure Until the Last update construction. There exist some inherent concurrency-related issues pertaining to PriDeFUL CT that are not necessarily pertinent to PriDe CT. Specifically, one issue is how one handles the setting where multiple senders are transacting with a receiver in that epoch. While they are capable of proving concurrency with respect to a state of the receiver and the contract can multiply all of them together to create the new state, deploying the UPKE-based solution for forward secrecy in this setting is unclear. For simplicity, it is assumed that there are two senders sending to that receiver. Then, sender 1 will generate $pk \cdot g^{\delta_1}$ and sender 2 will generate $pk \cdot g^{\delta_2}$. Further, the former generates the balance ciphertext as $pk^{r_1} \cdot g^{b_1}$ and $pk^{r_2} \cdot g^{b_2}$. The ciphertext update can be computed by homomorphic encryption, generating $pk^{r_1 r_1} \cdot g^{b_1+b_2}$. However, to update the encryption to be consistent with the evolved public key, one needs to generate $(pk \cdot g^{\delta_1 \delta_1})^{r_1+r_2} \cdot g^{b_1+b_2}$. Unfortunately, sender 1 does not know $\delta_2$ or $r_2$ to generate the necessary cross-terms, and vice versa for sender 2. Therefore, a simple solution for PriDeFUL CT is to simply apply the solution for FUL-Zether to PriDe CT. In FUL-Zether, the sender chooses the update for the receiver and provides the necessary information to (a) help the receiver update the secret key, and (b) the contract to evolve the ciphertext to be consistent with the updated public key. For PriDeFUL CT, there are two options: (1) either the sender chooses one receiver among its receiver set and updates that receiver's key similar to FUL-Zether, or (2) the sender performs that process for every receiver in its set. Relying on the UPKE ensures that even if the sender is malicious, this update of the receiver's key cannot affect the security of the key unless the sender corrupts and retrieves the key.

There may also be a situation when two senders choose the same receiver to update the key. While the receiver's balance can be easily updated in a consistent manner, the key update is another problem. In this situation, the contract simply chooses not to update the public key of the receiver. In an exemplary embodiment, a construction of PriDeFUL CT achieves FUL-security, allowing the sender to post a single message, either for one or all of the receivers, by including some additional messages, similar to the one for FUL-Zether as described above, in their standard communication. The result is mathematically correct and enjoys the same benefits of forward security as obtained from FUL-Zether. While this solution does enjoy the spoils of concurrent transaction, concurrent attempts to update the key have to necessarily fail.

Accordingly, with this technology, an optimized process for facilitating payments that are executable on a decentralized network platform while providing receiver anonymity and confidentiality of transaction messages is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for preserving an anonymity of a recipient of a payment, the method being implemented by at least one processor, the method comprising:

receiving, by the at least one processor from a decentralized platform associated with a payor, first information that relates to an amount of a first payment being made to a first recipient;

receiving, by the at least one processor from the decentralized platform associated with the payor, second information that relates to a first secret key that corresponds to a first public key associated with the payor;

receiving, by the at least one processor from the decentralized platform associated with the payor, third information that indicates that a sender has generated a first ciphertext message that relates to the first payment;

receiving, by the at least one processor from the decentralized platform associated with the payor, fourth information that proves that the amount of the first payment does not exceed a first account balance of a first account from which the first payment is withdrawn;

generating, by the at least one processor via a private decentralized confidential transactions protocol, a random value;

generating, by the at least one processor via the private decentralized confidential transactions protocol, a second ciphertext message that encrypts the random value;

updating, by the at least one processor via the private decentralized confidential transactions protocol, the first secret key to a second secret key based on the second ciphertext message;

updating, by the at least one processor via the private decentralized confidential transactions protocol, the first public key to a second public key based on the second secret key;

verifying, by the at least one processor via the private decentralized confidential transactions protocol, the updating of the first public key to the second public key using a first summation-based proof; and updating, by the at least one processor, a second account balance of a second account associated with the first recipient, wherein the private decentralized confidential transactions protocol is implemented via a computer programming language.

2. The method of claim 1, wherein the first ciphertext message relates to each of the first payment and at least a second payment being made to a second recipient.

3. The method of claim 2, wherein each of the first payment and the at least second payment is being made via a blockchain platform.

4. The method of claim 2, further comprising:
wherein the second ciphertext message includes fifth information that relates to an update offset value that is selected by the payor, encrypted by using the first public key, and used for the updating of the first public key to the second public key;
recovering the update offset value by using the first secret key to decrypt the second ciphertext message; and
using the update offset value for the updating of the first secret key to the second secret key,
wherein the fifth information includes proof that the update offset value has been correctly selected, encrypted, and used for updating the first public key.

5. The method of claim 2, wherein the first ciphertext message is encrypted by using an ElGamal encryption scheme by which the fourth information is made accessible by using the first public key.

6. The method of claim 2, wherein the second information includes information showing a validity of the payor by proving that the payor has knowledge of the first secret key that corresponds to the first public key associated with the payor.

7. The method of claim 2, further comprising receiving, from the decentralized platform associated with the payor, sixth information that indicates a knowledge of a randomness being used in the first ciphertext message.

8. The method of claim 2, further comprising receiving, from the decentralized platform associated with the payor, seventh information that indicates that a first sum of the first payment and each of the at least second payment is equal to a change in the first account balance from which each of the first payment and each of the at least second payment is withdrawn.

9. The method of claim 2, further comprising receiving, from the decentralized platform associated with the payor, eighth information that proves that the first ciphertext message is well-formed by performing a homomorphic addition operation using the first account balance and the first public key.

10. The method of claim 1, wherein the first payment is associated with at least one from among an account creation operation, an account funding operation, an account burning operation, and a transfer of assets operation.

11. A computing apparatus for preserving an anonymity of a recipient of a payment, the computing apparatus comprising:
a processor;
a memory; and
a communication interface coupled to each of the processor and the memory,
wherein the processor is configured to:
receive, from a decentralized platform associated with a payor via the communication interface, first information that relates to an amount of a first payment being made to a first recipient;
receive, from the decentralized platform associated with the payor via the communication interface, second information that relates to a first secret key that corresponds to a first public key associated with the payor;
receive, from the decentralized platform associated with the payor via the communication interface, third information that indicates that a sender has generated a first ciphertext message that relates to the first payment;
receive, from the decentralized platform associated with the payor via the communication interface, fourth information that proves that the amount of the first payment does not exceed a first account balance of a first account from which the first payment is withdrawn;
generate, via a private decentralized confidential transactions protocol, a random value;
generate, via the private decentralized confidential transactions protocol, a second ciphertext message that encrypts the random value;
update, via the private decentralized confidential transactions protocol, the first secret key to a second secret key based on the second ciphertext message;
update, via the private decentralized confidential transactions protocol, the first public key to a second public key based on the second secret key:
verify, via the private decentralized confidential transactions protocol, the update of the first public key to the second public key using a first summation-based proof; and
update a second account balance of a second account associated with the first recipient,
wherein the private decentralized confidential transactions protocol is implemented via a computer programming language.

12. The computing apparatus of claim 11, wherein the first ciphertext message relates to each of the first payment and at least a second payment being made to a second recipient.

13. The computing apparatus of claim 12, wherein each of the first payment and the at least second payment is being made via a blockchain platform.

14. The computing apparatus of claim 12, wherein the second ciphertext message includes fifth information that relates to an update offset value that is selected by the payor, encrypted by using the first public key, and used for the update of the first public key to the second public key;
wherein the processor is further configured to:
recover the update offset value by using the first secret key to decrypt the second ciphertext message; and
use the update offset value for the update of the first secret key to the second secret key,
wherein the fifth information includes proof that the update offset value has been correctly selected, encrypted, and used for updating the first public key.

15. The computing apparatus of claim 12, wherein the first ciphertext message is encrypted by using an ElGamal encryption scheme by which the fourth information is made accessible by using the first public key.

16. The computing apparatus of claim 12, wherein the second information includes information showing a validity of the payor by proving that the payor has knowledge of the first secret key that corresponds to the first public key associated with the payor.

17. The computing apparatus of claim 12, wherein the processor is further configured to receive, from the decentralized platform associated with the payor via the communication interface, sixth information that indicates a knowledge of a randomness being used in the first ciphertext message.

18. The computing apparatus of claim 12, wherein the processor is further configured to receive, from the decentralized platform associated with the payor via the communication interface, seventh information that indicates that a first sum of the first payment and each of the at least second payment is equal to a change in the first account balance from which each of the first payment and each of the at least second payment is withdrawn.

19. A non-transitory computer readable storage medium storing instructions for preserving an anonymity of a recipient of a payment, the storage medium comprising executable code which, when executed by a processor, causes the processor to:

receive, from a decentralized platform associated with a payor, first information that relates to an amount of a first payment being made to a first recipient;

receive, from the decentralized platform associated with the payor, second information that relates to a first secret key that corresponds to a first public key associated with the payor;

receive, from the decentralized platform associated with the payor, third information that indicates that a sender has generated a first ciphertext message that relates to the first payment; and receive, from the decentralized platform associated with the payor, fourth information that proves that the amount of the first payment does not exceed a first account balance of a first account from which the first payment is withdrawn;

generate, via a private decentralized confidential transactions protocol, a random value;

generate, via the private decentralized confidential transactions protocol, a second ciphertext message that encrypts the random value;

update, via the private decentralized confidential transactions protocol, the first secret key to a second secret key based on the second ciphertext message;

update, via the private decentralized confidential transactions protocol, the first public key to a second public key based on the second secret key;

verify, via the private decentralized confidential transactions protocol, the update of the first public key to the second public key using a first summation-based proof; and update a second account balance of a second account associated with the first recipient, wherein the private decentralized confidential transactions protocol is implemented via a computer programming language.

20. The storage medium of claim 19, wherein the first ciphertext message relates to each of the first payment and at least a second payment being made to a second recipient.

* * * * *